United States Patent [19]

Killeen et al.

[11] 4,330,445

[45] May 18, 1982

[54] CHINAWOOD OIL-PHENOLIC RESIN CONDENSATES

[75] Inventors: James J. Killeen, Mundelein; Thomas H. Plaisance, Wilmette; Kazys Sekmakas, Palatine, all of Ill.

[73] Assignee: De Soto, Inc., Des Plaines, Ill.

[21] Appl. No.: 197,280

[22] Filed: Oct. 15, 1980

[51] Int. Cl.³ .............................................. C08G 63/48
[52] U.S. Cl. .................................................. 525/501.5
[58] Field of Search ............. 260/19 R, 19 N, 19 UA, 260/20

[56] References Cited

U.S. PATENT DOCUMENTS

| | | | |
|---|---|---|---|
| 1,988,959 | 1/1935 | Pennell | 260/19 R |
| 2,101,791 | 12/1937 | Ellis | 260/19 R |
| 2,345,357 | 3/1944 | Powers | 260/19 N |
| 3,479,307 | 11/1969 | Laganis | 260/20 |

*Primary Examiner*—Paul R. Michl
*Attorney, Agent, or Firm*—Dressler, Goldsmith, Shore, Sutker & Milnamow, Ltd.

[57] ABSTRACT

A chinawood oil-phenolic resin condensate particularly useful in high solids content solution coatings is produced by heat reacting: (1) an o-cresol-formaldehyde condensate containing about 1 to about 2 mols of formaldehyde per mol of o-cresol; with (2) from about 80% to about 95% of its weight of chinawood oil; and (3) from 2% to 10% of the total weight of an alkyd resin which is a condensate of a polyethylenically unsaturated monocarboxylic fatty acid containing from 16–22 carbon atoms with about 0.5 mol per mol of said acid of an aliphatic glycol having a molecular weight of less than about 200.

6 Claims, No Drawings

CHINAWOOD OIL-PHENOLIC RESIN CONDENSATES

DESCRIPTION

1. Technical Field

This invention relates to chinawood oil-phenolic resin condensates which are useful in interior sanitary can coatings, and for various other purposes.

2. Background Art

Chinawood oil-phenolic resin condensates have previously been used for interior sanitary can application. However, to provide good properties, the condensates must possess high molecular weight, and this, in turn, requires a large proportion of organic solvent in order to provide a workable application viscosity. Environmental and cost considerations now demand that the solvent content be reduced, and this is the objective of this invention. However, one cannot simply lower the molecular weight of the condensate because, when that is attempted, the coating exhibits poor wetting characteristics and the cured film cures poorly and tends to sag as it is baked. Also, the slower cure leads to poor fabrication properties and lowered chemical resistance.

DISCLOSURE OF INVENTION

In this invention, chinawood oil is condensed with from about 80% to about 95% of its own weight of an o-cresol-formaldehyde condensate containing about 1 to about 2 mols of formaldehyde per mol of o-cresol, and the reaction is carried out in the presence of 2% to 10% by weight of an alkyd resin which is a condensate of a polyethylenically unsaturated monocarboxylic fatty acid containing from 16–22 carbon atoms, preferably linseed fatty acid, with an aliphatic glycol having a molecular weight of less than about 200, such as diethylene glycol, to form a diester between the two. About 0.5 mol of the glycol is used per mol of acid to form the diester.

When these three components are cooked together, a high molecular weight reactive product is obtained having improved solubility, and this product can be blended with chinawood oil-phenolic resin condensates of the prior art to provide blends which have increased solubility in organic solvents, but which cure rapidly to provide good properties even when the unmodified condensates are lowered in molecular weight so as to enable the formulation of coating solutions of higher resin solids content.

The o-cresol-formaldehyde condensate is itself a conventional and available product, and it normally contains about 1 mol of formaldehyde per mol of o-cresol.

Chinawood oil is a highly unsaturated triglyceride, also known as tung oil.

When the o-cresol-formaldehyde condensate is cooked with the chinawood oil in the absence of modification, as in this invention, the o-cresol-formaldehyde condensate which is used is the same as in the invention, but there is no third component. The relative proportions of the condensate and the chinawood oil is an about equiweight ratio, which is intended to include a minor variation of ±5%.

The alkyd resin which is used is a diester of a polyethylenically unsaturated monocarboxylic fatty acid which is preferably linseed fatty acid. Other useful unsaturated fatty acids are illustrated by dehydrated castor oil fatty acid, linoleic fatty acid, linolenic fatty acid, and eleostearic fatty acid. Nonconjugated double bonds are preferred, but this is not essential.

The low molecular weight aliphatic glycol which is selected is preferably an ether, like diethylene glycol, triethylene, tetraethylene glycol or dipropylene glycol, but 1,4-butane diol or 1,6-hexane diol are also useful. The molecular weight of the glycol is preferably at least 75.

This alkyd resin is used to modify the chinawood oil condensate with 80–95% of its weight of o-cresol-formaldehyde condensate in an amount of from 2–10% of the total weight of the modified resin, preferably from 3–8% of its total weight.

The modified resins of this invention are desirably used in a blend with the unmodified chinawood oil condensate with o-cresol-formaldehyde condensate, the weight ratio of the modified condensate to the unmodified condensate being from 1:2 to 1:6. As previously indicated, the chinawood oil and the o-cresol-formaldehyde condensate in the unmodified condensate are used in about an equal weight of each. The preferred unmodified condensates are cooked until they possess a viscosity measured at 25° C. in 80% solids in n-butanol of at least about Y on the Gardner-Holdt scale.

The chinawood oil condensates are cured with an aminoplast resin which is preferably a hexamethylol melamine etherified to be compatible with the condensates. At least about 1% up to about 10% of the aminoplast curing agent would be used, based on the total weight of resin solids.

This cure is itself well known and is conventionally catalyzed with an acid catalyst. A suitable acid catalyst is illustrated herein by phosphoric acid.

The coating compositions of this invention are solvent solution coatings, and solvent selection is a secondary consideration. The preferred solvent is n-butanol, but other alcoholic solvents, such as 2-ethoxy ethanol, are also useful. A proportion of aromatic hydrocarbon solvent may also be present, such as toluene. From 60–80% solids solutions are preferred.

BEST MODE FOR CARRYING OUT THE INVENTION

EXAMPLE 1

| parts by weight | Component |
| --- | --- |
| 50 | o-cresol-formaldehyde condensate (1:1 mol ratio) |
| 5 | diester of 2 mols of linseed fatty acid with 1 mol of diethylene glycol |
| 45 | chinawood oil |

The above materials are placed in a reactor having a stirrer, thermometer, Dean-Stark trap, nitrogen inlet tube and condenser. Heat is applied to about 140°–150° C. and water is removed until the product has a viscosity measured at 25° C. at 80% solids in n-butanol of $Z_3$–$Z_7$ (Gardner-Holdt). The product is cooled and n-butanol is added to 80% solids. The solution may be strained, if desired, to remove any particles which may be present.

EXAMPLE 2

The solution of example 1 is blended with the conventional o-cresol-formaldehyde condensate with chinawood oil. This conventional product can be made by reacting 50 parts of chinawood oil with 50 parts of the o-cresol-formaldehyde condensate used in Example 1. This mixture is heated to 250° F. and held for a viscosity measured at 25° C. in 80% solids in n-butanol of Y–Z. More n-butanol is then added to dilute the blend to 80% solids.

The blend of the modified condensate of Example 1 with the unmodified condensate used in this Example is made on a 1:4 weight ratio basis.

This blend can then be used in can coatings in place of the conventional coil coatings. In this way, the solution which is applied will contain in excess of 60% resin solids instead of the 30%–40% solids which is normally used.

EXAMPLE 3

In order to provide a typical coating composition in accordance with this invention, an aminoplast curing agent is added to the 80% solids blend of Example 2 in an amount of 2.5% by weight, based on the weight of the solution. An appropriate aminoplast is hexamethylol melamine etherified 85% with methanol and 15% with butanol. The Monsanto product, Resimene 753 is of the general type described and can be used.

The cure can be catalyzed with a typical acid catalyst such as a 50% solution of 85% phosphoric acid in diacetone alcohol. This solution is used in an amount of 0.25% by weight, based on the weight of the solution.

Driers are also desirably present to facilitate the oxidative cure of the unsaturation in the chinawood oil component. A mixture of cobalt napthenate and manganese octoate (an equiweight mixture) used as a 6% solution in mineral spirits is an appropriate drier composition. It is used in an amount of 0.25% by weight, based on the weight of the solution.

The coating composition for roller coat application is typically adjusted to desired coating viscosity by the addition of n-butanol. About 4.5% of n-butanol is usually appropriate for this purpose, and this provides a solids content of about 64%.

The coating of this example is typically applied in a film having a thickness of 0.3 mil. and baked for 10 minutes at 400° F. The coatings are particularly useful as an end enamel for beer or beverage cans where it provides good water and pasteurization resistance and excellent flexibility.

The modified chinawood oil-phenolic resin condensates of this invention possess varied utility, the foregoing examples having illustrated the most advantageous utility presently contemplated.

Other utilities are illustrated by the incorporation of the modified chinawood oil-phenolic resin condensates of this example into thermosetting coating systems in amounts of from 2% to 20% by weight of total resin solids to enhance the flexibility of the cured coating while retaining the cure capacity associated with the unmodified thermosetting system. Standard alkyd-melamine solution coatings and epoxy-phenolic solution coatings are two types of thermosetting coating systems which can be so-modified, typically by the incorporation of 5% of the modified condensate of Example 1. Incorporation is by simply stirring in the 80% solids n-butanol solution described in Example 1.

What is claimed is:

1. A chinawood oil-phenolic resin condensate produced by heat reacting; (1) an o-cresol-formaldehyde condensate containing about 1 to about 2 mols of formaldehyde per mol of o-cresol; with (2) from about 80% to about 95% of its weight of chinawood oil; and (3) from 2% to 10% of the total weight of an alkyd resin which is a condensate of a polyethylenically unsaturated monocarboxylic fatty acid containing from 16–22 carbon atoms with about 0.5 mol per mol of said acid of an aliphatic glycol having a molecular weight of less than about 200, said components being heat reacted to a viscosity measured at 25° C. of at least about Z on the Gardner-Holdt scale in 80% solution in n-butanol.

2. A condensate as recited in claim 1 in which said o-cresol-formaldehyde condensate contains about 1 mol of formaldehyde per mol of o-cresol.

3. A condensate as recited in claim 1 in which said glycol is an ether glycol.

4. A condensate as recited in claim 3 in which said glycol is diethylene glycol.

5. A condensate as recited in claim 1 in which said alkyd resin is used in an amount of from 3% to 8% by weight.

6. A blend of the condensate of claim 1 with a condensate consisting of chinawood oil and an o-cresol formaldehyde condensate as recited in claim 1 in about equiweight ratio, the weight ratio of said condensate of claim 1 to the equiweight condensate being from 1:2 to 1:6.

* * * * *